(12) United States Patent
Matsuoka et al.

(10) Patent No.: US 12,121,999 B2
(45) Date of Patent: Oct. 22, 2024

(54) ARC-WELDING CONTROL METHOD

(71) Applicant: Panasonic Intellectual Property Management Co., Ltd., Osaka (JP)

(72) Inventors: Noriyuki Matsuoka, Osaka (JP); Masaru Kowa, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1042 days.

(21) Appl. No.: 17/072,648

(22) Filed: Oct. 16, 2020

(65) Prior Publication Data

US 2021/0031290 A1  Feb. 4, 2021

Related U.S. Application Data

(63) Continuation of application No. PCT/JP2019/016033, filed on Apr. 12, 2019.

(30) Foreign Application Priority Data

Apr. 18, 2018 (JP) .................................. 2018-079988

(51) Int. Cl.
*B23K 9/09* (2006.01)
*B23K 9/073* (2006.01)
(Continued)

(52) U.S. Cl.
CPC .............. *B23K 9/093* (2013.01); *B23K 9/073* (2013.01); *B23K 9/095* (2013.01); *B23K 9/125* (2013.01);
(Continued)

(58) Field of Classification Search
CPC ........ B23K 9/093; B23K 9/073; B23K 9/095; B23K 9/125; B23K 9/164; B23K 9/173;
(Continued)

(56) References Cited

U.S. PATENT DOCUMENTS 4,994,646 A    2/1991 Tabata et al.
5,473,139 A *  12/1995 Matsui .................. B23K 9/092
                                                    219/130.51
(Continued)

FOREIGN PATENT DOCUMENTS

CN    102233469    * 11/2011
EP      0607819    *  7/1994
(Continued)

OTHER PUBLICATIONS

JP11138265 (Year: 2024)*
(Continued)

*Primary Examiner* — Nathaniel E Wiehe
*Assistant Examiner* — Frederick F Calvetti
(74) *Attorney, Agent, or Firm* — Wenderoth, Lind & Ponack, L.L.P.

(57) ABSTRACT

A pulse welding period includes a first peak period for supplying a first peak current to a welding wire, a first base period for supplying a base current smaller than the first peak current to the welding wire, a second peak period for supplying a second peak current to the welding wire after alternately repeating the first peak period and the first base period (n−1) times (n is an integer equal to or larger than 2), and a second base period for supplying the base current to the welding wire. The second peak current is larger than the first peak current, and droplets are transferred from the welding wire during the second peak period or the second base period.

16 Claims, 7 Drawing Sheets

(51) Int. Cl.
　　　*B23K 9/095*　　(2006.01)
　　　*B23K 9/12*　　(2006.01)
　　　*B23K 9/16*　　(2006.01)
　　　*B23K 9/173*　　(2006.01)
　　　*B23K 9/23*　　(2006.01)
　　　*B23K 35/38*　　(2006.01)
　　　*B23K 103/10*　　(2006.01)

(52) U.S. Cl.
　　　CPC .............. *B23K 9/164* (2013.01); *B23K 9/173* (2013.01); *B23K 9/23* (2013.01); *B23K 35/383* (2013.01); *B23K 2103/10* (2018.08)

(58) Field of Classification Search
　　　CPC .... B23K 9/23; B23K 35/383; B23K 2103/10; B23K 9/0732
　　　See application file for complete search history.

(56) References Cited

U.S. PATENT DOCUMENTS

| | | | |
|---|---|---|---|
| 5,495,091 A * | 2/1996 | Tabata | G05F 1/08 |
| | | | 219/130.51 |
| 5,525,778 A | 6/1996 | Matsui et al. | |
| 5,726,419 A * | 3/1998 | Tabata | G05F 1/08 |
| | | | 219/130.51 |
| 5,800,911 A | 9/1998 | Sankey et al. | |
| 5,811,756 A | 9/1998 | Horita et al. | |
| 2008/0237196 A1 | 10/2008 | Yamazaki et al. | |
| 2009/0242533 A1* | 10/2009 | Yamazaki | B23K 9/0956 |
| | | | 219/130.32 |
| 2011/0259853 A1* | 10/2011 | Yamazaki | B23K 9/092 |
| | | | 219/74 |
| 2017/0225253 A1 | 8/2017 | Matsuoka et al. | |
| 2019/0176257 A1* | 6/2019 | Furuyama | B23K 9/073 |

FOREIGN PATENT DOCUMENTS

| | | | |
|---|---|---|---|
| JP | 60-006277 | 1/1985 | |
| JP | 1-254385 | 10/1989 | |
| JP | 02-031630 | 7/1990 | |
| JP | 6-218546 | 8/1994 | |
| JP | 6-285631 | 10/1994 | |
| JP | H06285631 | * 10/1994 | |
| JP | 8-197255 | 8/1996 | |
| JP | 11-090629 | 4/1999 | |
| JP | 11138265 | * 5/1999 | |
| JP | 11-151577 | 6/1999 | |
| JP | 11291042 | * 10/1999 | |
| JP | 3282285 | * 5/2002 | |
| JP | 2004-009061 | 1/2004 | |
| JP | 2006-130512 | 5/2006 | |
| JP | 2009-233728 | 10/2009 | |
| JP | 4857163 | 1/2012 | |
| JP | 2016128187 | * 7/2016 | |
| JP | 2017-205794 | 11/2017 | |
| WO | WO2013190746 | * 12/2013 | |
| WO | 2016/059805 | 4/2016 | |
| WO | WO2018043626 | * 3/2018 | |
| WO | WO2019203163 | * 11/2019 | |

OTHER PUBLICATIONS

JP2016128187 (Year: 2024)*
WO2019203163 (Year: 2024)*
JP3282285 (Year: 2024)*
First Examination Report (FER) issued Oct. 6, 2022 in counterpart Indian Patent Application No. 202047049084.
International Search Report issued Jul. 9, 2019 in International (PCT) Application No. PCT/JP2019/016033 with English translation.
Exended European Search Report issued Jun. 7, 2021 in corresponding European Patent Application No. 19788969.4.

* cited by examiner

FIG.5

| SET CURRENT Is(A) | SET VOLTAGE Vs(V) | WIRE FEEDING SPEED Wp(m/min) | SECOND PEAK CURRENT Ip2(A) | SECOND PEAK PERIOD Tp2(msec) | FIRST PEAK CURRENT Ip1(A) | FIRST PEAK PERIOD Tp1(msec) | Ip2−Ip1 (A) | Ip2/Ip1 (%) | Tp2−Tp1 (msec) | PULSE NUMBER n (TIMES) |
|---|---|---|---|---|---|---|---|---|---|---|
| 60 | 15.6 | 4 | 380 | 330 | 150 | 280 | 230 | 253 | 50 | 12 |
| 80 | 15.8 | 5 | 380 | 320 | 165 | 285 | 215 | 230 | 35 | 9 |
| 90 | 16.0 | 6 | 380 | 315 | 180 | 300 | 200 | 211 | 15 | 6 |
| 110 | 16.2 | 7 | 380 | 313 | 200 | 310 | 180 | 190 | 3 | 2 |

ARC-WELDING CONTROL METHOD

CROSS-REFERENCE TO RELATED APPLICATIONS

This is a continuation of International Application No. PCT/JP2019/016033 filed on Apr. 12, 2019, which claims priority to Japanese Patent Application No. 2018-079988 filed on Apr. 18, 2018. The entire disclosures of these applications are incorporated by reference herein.

BACKGROUND

The present invention relates to an arc welding control method, and particularly to a pulse welding control method.

Consumable electrode type MIG (Metal Inert Gas) welding and MAG (Metal Active Gas) welding have been increasingly applied to welding of bicycles, motorcycles, and the like from viewpoints of producing beautiful wavy welding beads and improving productivity. According to the consumable electrode type MIG welding and MAG welding, welding is performed while melting a welding wire by utilizing arc heat generated between the welding wire and a base material in accordance with supply of current to the welding wire provided as an electrode. Accordingly, welding efficiency and welding speed can be raised.

Meanwhile, there has been proposed a method which produces a difference in a heat amount input to the base material as heat input amount control so as to control a bead shape of consumable electrode type MIG welding and MAG welding. Typical examples of this method include short-circuit welding and pulse welding. In these methods, pulse welding is performed by alternately supplying a peak current higher than a critical current value and sufficient for separating droplets from the welding wire, and a base current lower than the critical current value and sufficient for maintaining an arc to the welding wire to achieve droplet transfer while maintaining an average current value equal to or lower than the critical current value. Accordingly, pulse welding is often adopted. Moreover, this method transfers one droplet in a period for supplying a peak current once, and therefore is also called one-pulse and one-drop.

On the other hand, problems have been arising from pulse welding, such as a problem that spatters are more likely to be generated by a high current value during droplet separation, and a problem that one-pulse one-drop control is difficult to achieve due to large reaction force when $CO_2$ gas is used as shielding gas.

Accordingly, there have been proposed a control method which continuously performs separation and growth of droplets (for example, see Japanese Examined Patent Publication No. H02(1990)-031630) by changing a waveform of a peak current, and a control method which applies pulses having different peak values and pulse widths to a welding current to separate droplets by one pulse and grow droplets by another pulse (for example, see Japanese Patent No. 4857163).

SUMMARY

Meanwhile, aluminum and an alloy containing aluminum as a main component are often used as a base material corresponding to a welding target in recent years. Pulse welding is also increasingly applied to these types of arc welding.

However, each of the conventional methods disclosed in Japanese Examined Patent Publication No. H02(1990)-031630 and Japanese Patent No. 4857163 relates to arc welding using $CO_2$ gas. In this case, these methods are difficult to apply to arc welding which uses a shielding gas containing an inert gas as a main component without change. Separation of droplets therefore may become unstable. Besides, pulse welding has a problem that a heat amount input to a base material is larger than that amount of short-circuit welding. In this case, each width of welding beads is difficult to reduce.

Moreover, when pulse welding is applied to an aluminum-based material, particularly in a case where the welding wire is a hard aluminum-based material, metal oxide (hereinafter referred to as smut), which is an oxide where metal vapor evaporated from the base material or the welding wire and oxygen in the atmosphere are combined, easily adheres to the base material. In this case, external appearance of welding beads deteriorates.

In view of the foregoing, it is an object of the present invention to provide an arc welding control method capable of securely transferring droplets in a predetermined period, and performing pulse welding at low current in a stable manner.

For achieving the above object, an arc welding control method according to the present invention includes a pulse welding period for feeding a welding wire toward a base material at a constant feeding speed, and generating an arc between the base material and the welding wire by alternately supplying a peak current and a base current to the welding wire. The pulse welding period includes: a first peak period for supplying a first peak current to the welding wire; a first base period for supplying a base current smaller than the first peak current to the welding wire after the first peak period; a second peak period for supplying a second peak current to the welding wire after alternately repeating the first peak period and the first base period (n−1) times (n is an integer equal to or larger than 2); and a second base period for supplying the base current to the welding wire after the second peak period. The second peak current is larger than the first peak current. Droplets are transferred from the welding wire toward the base material during the second peak period or the second base period.

According to this method, the droplets can be securely transferred to the base material during a predetermined period. Moreover, stable pulse welding can be performed by a low welding current.

According to the present invention, droplets can be securely transferred to a base material during a predetermined period, and welding beads having beautiful external appearance can be formed. Moreover, stable pulse welding can be performed by a low welding current.

BRIEF DESCRIPTION OF THE DRAWINGS

FIG. 5 is a diagram showing a relationship between a wire feeding speed and various outputs during pulse welding.

DETAILED DESCRIPTION

Present embodiments will be hereinafter described in detail with reference to the drawings. The following description of advantageous embodiments is mere examples in nature, and is not at all intended to limit the scope, applications or use of the present disclosure.

First Embodiment

Structure of Arc Welding Apparatus

Figure 1:
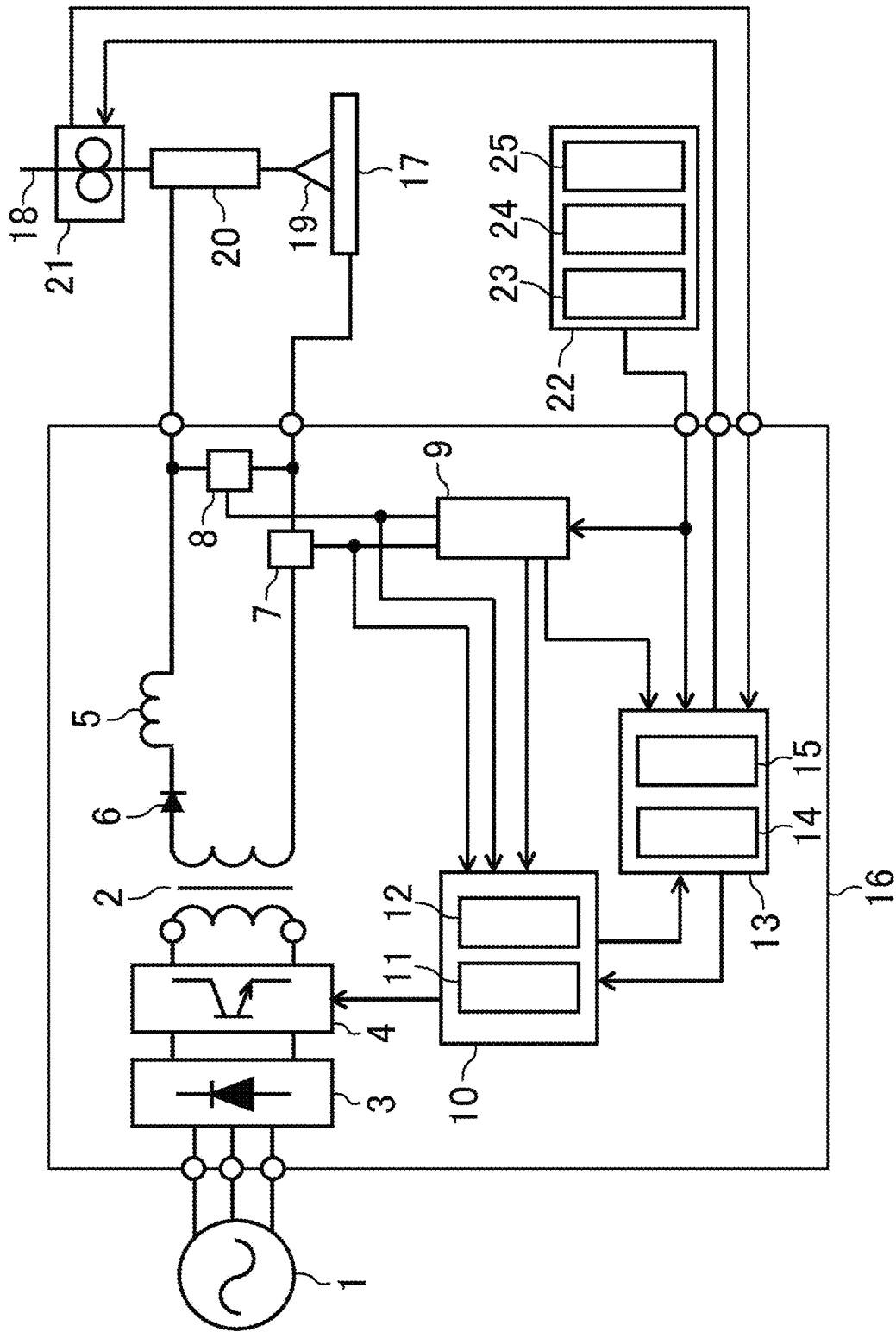
FIG. 1 is a diagram showing a schematic configuration of an arc welding apparatus according to a first embodiment of the present invention.

FIG. 1 is a diagram showing a schematic configuration of an arc welding apparatus according to the present embodiment. An arc welding apparatus 16 repeats an arc state and a short-circuit state between a welding wire 18 as a consumable electrode and a base material 17 as a welding target to perform welding. Note that the base material 17 is held by a not-shown torch. When the torch moves at a predetermined speed, a tip of the welding wire 18 also moves at the same speed along a predetermined welding section. In addition, the welding wire 18 in the present embodiment is made of hard aluminum (A5356) and has a wire diameter of 1.2 mm, while the base material 17 is made of aluminum. However, the base material 17 may be made of an alloy containing aluminum as a main component. In addition, shielding gas sprayed on the base material 17 contains Ar (argon) gas at a ratio of 80% or more.

The arc welding apparatus 16 includes a main transformer 2, a primary side rectifier 3, a switch 4, a DCL (reactor) 5, a secondary side rectifier 6, a welding current detector 7, a welding voltage detector 8, a control switch 9, an output controller 10, and a wire feeding speed controller 13. The arc welding apparatus 16 further includes a robot controller (not shown) for controlling an operation of a robot (not shown) that holds the torch (not shown).

The output controller 10 has a short-circuit welding controller 11 and a pulse welding controller 12. The wire feeding speed controller 13 includes a wire feeding speed detector 14 and a calculator 15. The primary side rectifier 3 rectifies an input voltage input from an input power source (three-phase AC power supply) 1 provided outside the arc welding apparatus 16. The switch 4 controls an output of the primary side rectifier 3 at an output suitable for welding. The main transformer 2 converts an output of the switch 4 into an output suitable for welding.

The secondary side rectifier 6 rectifies an output of the main transformer 2. The DCL (reactor) 5 smooths an output of the secondary side rectifier 6 to generate a current suitable for welding. The welding current detector 7 detects a welding current. The welding voltage detector 8 detects a welding voltage.

The control switch 9 is a switch that outputs, to the output controller 10, timing for switching from short-circuit welding control to pulse welding control, and from pulse welding control to cooling period. The control switch 9 has a timing function, and is configured to measure a predetermined time set by a welding condition setting part 22, and output timing for switching control to the output controller 10 and the wire feeding speed controller 13. Note that the "cooling period" is a period for setting a welding current I to zero. A heat amount input from the arc 19 is zero in this period (see FIG. 10).

The output controller 10 outputs a control signal to the switch 4 to control a welding output. The short-circuit welding controller 11 controls short-circuit welding when the control switch 9 commands short-circuit welding. The pulse welding controller 12 controls pulse welding when the control switch 9 commands pulse welding.

The wire feeding speed controller 13 controls a wire feeder 21 to control a feeding speed of the welding wire 18. The wire feeding speed detector 14 detects a wire feeding speed. The calculator 15 calculates an integrated amount of feeding amounts of the welding wire 18 based on a signal from the wire feeding speed detector 14 to control the wire feeding speed. Specifically, differences between a command value and detected values of the wire feeding speed are calculated by comparison between these values, and feedback control is performed in such a manner as to adjust an actual wire feeding speed to the command value based on an integrated amount of the differences.

The wire feeder 21 and the welding condition setting part 22 are connected to the arc welding apparatus 16. The welding condition setting part 22 is provided to set welding conditions of the arc welding apparatus 16. In addition, the welding condition setting part 22 has a short-circuit welding setting part 23, a pulse welding setting part 24, and a cooling period setting part 25. The wire feeder 21 controls feeding of the welding wire 18 based on a signal from the wire feeding speed controller 13.

A welding output of the arc welding apparatus 16 is supplied to the welding wire 18 via a welding tip 20 when a not-shown torch SW (switch) is turned on. Thereafter, an arc 19 is generated between the welding wire 18 and the base material 17 as a welding target based on the welding output of the arc welding apparatus 16 to perform welding.

Note that the control switch 9, the short-circuit welding setting part 23, and the cooling period setting part 25 may be removed when only pulse welding is performed in an actual situation of arc welding.

Control Method of Pulse Welding

Figure 2:
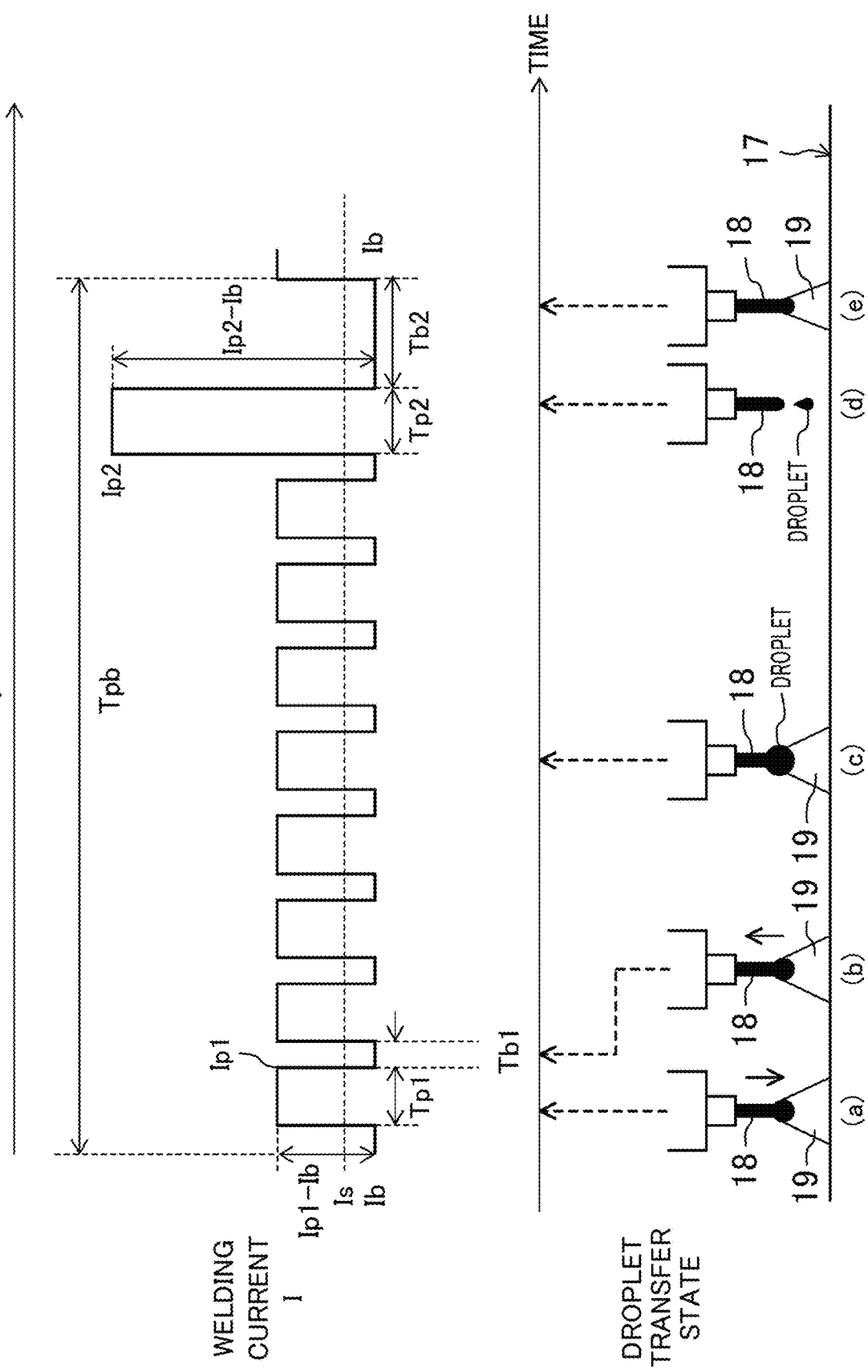
FIG. 2 is a diagram showing a welding current setting waveform and a droplet transfer state during pulse welding.
Figure 3:
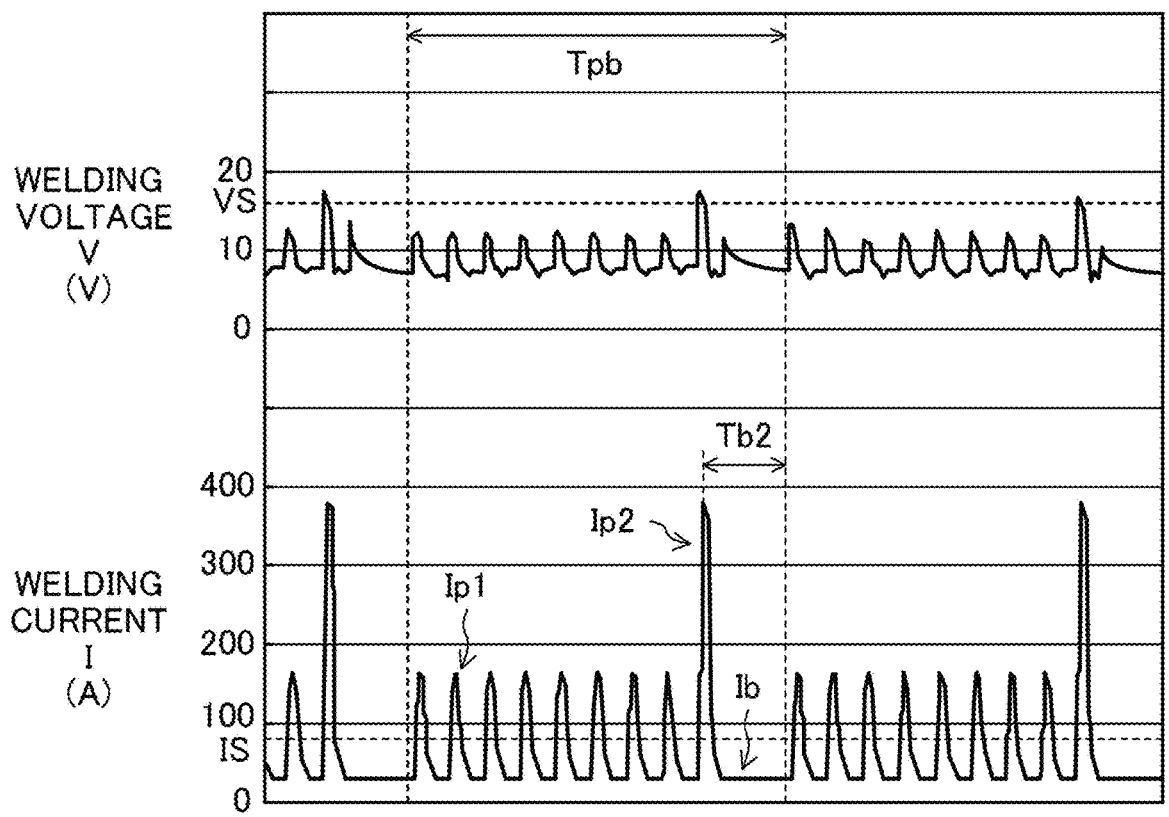
FIG. 3 is a diagram showing output waveforms of a welding current and a welding voltage during pulse welding.

FIG. 2 shows a time relationship between a setting waveform of a welding current and a droplet transfer state during pulse welding according to the present embodiment, while FIG. 3 shows output waveforms of a welding current and a welding voltage during pulse welding. While not shown in the figures, a feeding speed Wp of the welding wire 18 (hereinafter referred to as wire feeding speed Wp, see FIG. 10) is kept constant in a pulse welding period Tp.

Note that a set average value of the welding current I (hereinafter referred to as set current Is in some cases) corresponds to a moving average of the welding current I during the pulse welding period Tp, while a set average value of a welding voltage V (hereinafter referred to as set voltage Vs in some cases) corresponds to a moving average of the welding voltage V during the pulse welding period Tp. In addition, the set current Is and the wire feeding speed Wp have a proportional relationship. Specifically, the wire feeding speed Wp is determined in accordance with the set current Is. In a case of a feeding method which alternately repeats forward feeding and backward feeding of the welding wire 18, an average feeding speed Ws of the wire feeding speed Wp is determined in accordance with the set current Is.

As shown in FIG. 2, in the pulse welding period Tp, a basic unit period Tpb is repeated once or a plurality of times to perform pulse welding of the base material 17. Assuming that a period for allowing a flow of a first peak current Ip1 in the welding wire 18 is a first peak period Tp1, that a period for allowing a flow of a second peak current Ip2 in the welding wire 18 is a second peak period Tp2, that a period for allowing a flow of a base current Ib after the first peak period Tp1 is a first base period Tb1, and that a period for allowing a flow of the base current Ib after the second peak period Tp2 is a second base period Tb2, the basic unit period Tpb is expressed as formula (1).

$$Tpb=(n-1)\times(Tp1+Tb1)+Tp2+Tb2 \quad (1)$$

In this formula, n is an integer equal to or larger than 2.

In addition, each of the second peak current Ip2 and the first peak current Ip1 is set to a current larger than the base current Ib. Moreover, the second base period Tb2 is set to a period longer than the first base period Tb1. Furthermore, as will be described below in detail, the second peak current Ip2 is larger than the first peak current Ip1, and both the first and second peak currents Ip1 and Ip2 are determined in accordance with the set current Is. In addition, settings are determined such that droplets are transferred from the welding wire 18 toward the base material 17 during the second peak period Tp2 or the second base period Tb2. Therefore, n corresponds to a number of pulses required to transfer the droplets once toward the base material 17.

According to the present embodiment, settings are determined such that the set current Is is 80 A, that the set voltage Vs is 15.8 V, and that droplets are transferred once to the base material when n=9. However, the set current Is, the pulse number n, and the like are not particularly limited to these settings, but may be appropriately changed in accordance with pulse welding conditions.

Moreover, the first peak current Ip1 is set to 165 A, the second peak current Ip2 is set to 380 A, and the base current Ib is set to 50 A. As will be described below, the pulse number n required to transfer the droplets once from the welding wire 18 toward the base material 17 also changes in accordance with the set current Is (see FIGS. 5 and 6).

In addition, the first peak period Tp1 is set to 285 ms, the first base period Tb1 is set to 1.8 ms, the second peak period Tp2 is set to 320 ms, and the second base period Tb2 is set to 7.5 ms. These values are changeable in accordance with the set current Is.

During the period for alternately repeating supply of the first peak current Ip1 and supply of the base current Ib (n–1) times, the arc 19 is generated between the welding wire 18 and the base material 17. However, the droplets are not transferred from the welding wire 18 to base material 17. For example, as shown in the state (a) of FIG. 2, a slight amount of a droplet is formed at the tip of the welding wire 18 by a first pulse. Moreover, arc force vibrates the droplet up and down by repeating the first peak period Tp1 and the first base period Tb1 (see states (a) and (b) in FIG. 2).

In addition, the base material 17 and the welding wire 18 are partially evaporated when the base material 17 is irradiated with the arc 19 by the welding wire 18 as an electrode. In this case, smut may be produced.

Figure 4A:
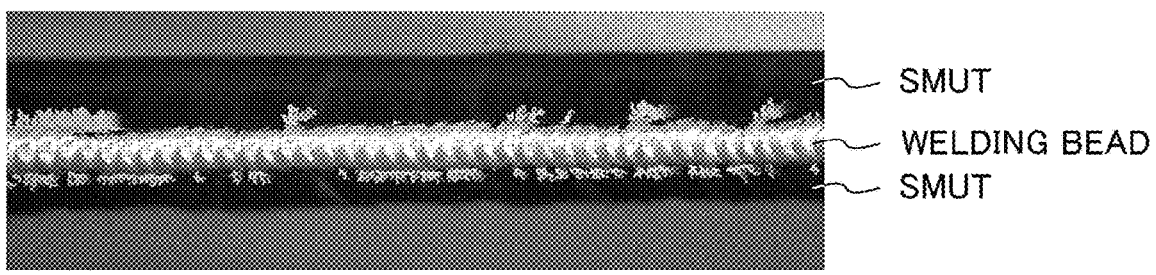
FIG. 4A is a photograph showing a shape of welding beads for comparison.
Figure 4B:
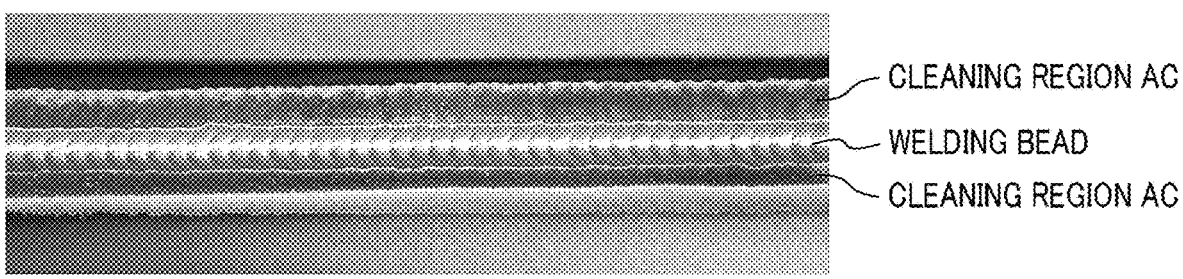
FIG. 4B is a photograph showing a shape of welding beads according to the first embodiment.

FIG. 4A shows a photograph of a shape of welding beads for comparison, while FIG. 4B shows a photograph of a shape of welding beads according to the present embodiment. Note that FIG. 4A shows a shape in a case where ordinary one-pulse one-drop control is performed. When the base material 17 is an aluminum-based material, particularly in a case where the welding wire 18 is hard aluminum, a large amount of smut may be produced and adhere to a surface of the base material 17 as shown in FIG. 4A. When smut adheres in this manner, external appearance of the welding beads deteriorates, and in extreme cases, formation of the weld bead is inhibited.

On the other hand, according to the present embodiment, the arc force of the arc 19 generated between the welding wire 18 and the base material 17 cyclically changes during the period in which the first peak period Tp1 and the first base period Tb1 are repeated. An oxide film on the surface of the base material 17 is decomposed and cleaned in the first peak period Tp1 by irradiating the surface of the base material 17 with the arc 19 in a state where the arc force is strengthened. In this manner, adhesion of smut to the surface of the base material 17 can be reduced. That is, a kind of cleaning action is operated, and a region without adhesion of smut (hereinafter referred to as cleaning region AC) is formed outside the beads as shown in FIG. 4B. Note that the cleaning action described above increases and enlarges a width of the cleaning region AC as the cycle for repeating the first peak period Tp1 and the first base period Tb1 becomes shorter, that is, a pulse frequency of the first peak current Ip1 becomes higher. In this manner, adhesion of smut is securely reduced.

Moreover, the welding wire 18 is heated by cyclically supplying the first peak current Ip1 larger than the base current Ib. Droplets therefore start to be formed at the tip of the welding wire 18 as described above. These droplets grow until reaching a predetermined size sufficient for transfer to the base material 17. For example, a state (c) of FIG. 2 shows a state of the droplet in the middle of the growth. In this state, the droplet larger than a wire diameter of the welding wire 18 is formed. Moreover, the droplet vibrates up and down in accordance with fluctuations of the arc force while growing.

During the first base period Tb1 for allowing the flow of the base current Ib in the welding wire 18, droplets hardly grow. However, an arc length of the arc 19 generated between the welding wire 18 and the base material 17 is maintained at a predetermined value. In other words, the base current Ib is supplied to the welding wire 18 to maintain the arc length at the predetermined value. In addition, the first peak current Ip1 can be supplied to the welding wire 18 in a stable manner in the next first peak period Tp1 by maintaining the arc length at the predetermined value.

When the second peak current Ip2 is subsequently supplied to the welding wire 18 in the second peak period Tp2, the droplet formed at the tip of the welding wire 18 is transferred toward the base material 17 as shown in a state (d). Moreover, the base current Ib is supplied in the second base period Tb2 after the second peak period Tp2 to adjust a generation state of the arc 19 such that the arc length is equalized with a value of the arc length in the first base period Tb1, that is, a predetermined value along with reduction of melting of the tip of the welding wire 18 (see state (e)). Note that this predetermined value may be appropriately varied in accordance with the welding conditions of pulse welding.

Furthermore, in an actual welding output, the welding voltage V also cyclically fluctuates in accordance with cyclic fluctuations of the welding current I, and the welding voltage V also changes in accordance with a magnitude of the welding current I as shown in FIG. 3. In addition, after completion of the transfer of the droplets, the welding voltage V rises by a temporal increase in the arc length. However, the welding voltage V gradually decreases during the second base period Tb2 to approach a predetermined value. That is, convergence of the arc length to the above-mentioned predetermined value is indicated.

Moreover, the basic unit period Tpb as a pulse welding period for separating and transferring droplets to the base material 17 once changes in accordance with a change in the set current Is or the wire feeding speed Wp. Specifically, the basic unit period Tpb becomes shorter as the set current Is or the wire feeding speed Wp increases.

The basic unit period Tpb as the pulse welding period includes the first peak current period Tp1, the first base current period Tb1, the second peak current period Tp2, and the second base current period Tb2. In the basic unit period Tpb as this pulse welding period, settings are determined such that droplets are transferred once from the welding wire 18 toward the base material 17 during the second peak period Tp2 or the second base period Tb2 for each cycle. In other words, settings are determined such that the droplets are not transferred from the welding wire 18 toward the base material 17 during the first peak current period Tp1 and the first base current period Tb1, but are transferred from the welding wire 18 toward the base material 17 only during the second peak period Tp2 or the second base period Tb2 for each cycle of the basic unit period Tpb as the pulse welding period.

Figure 6:
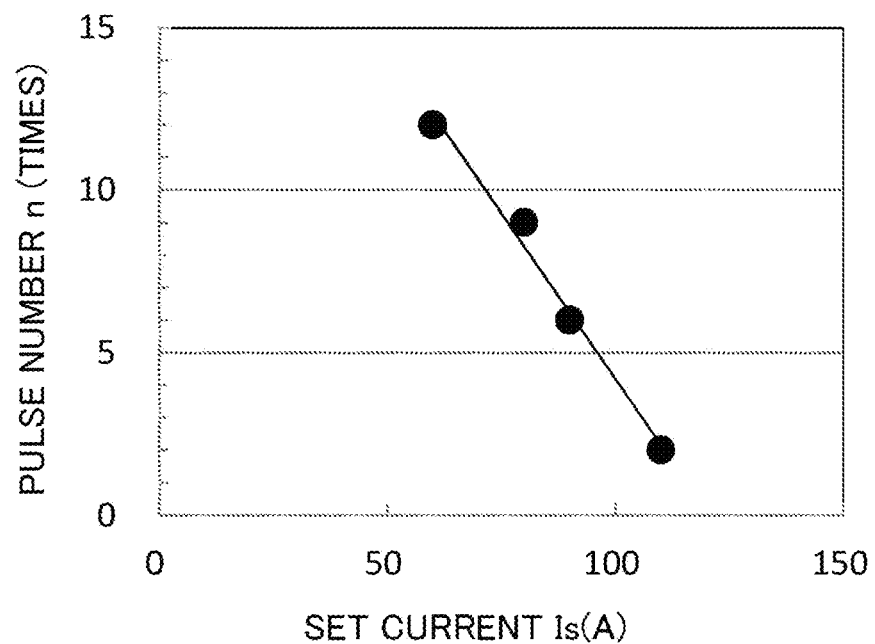
FIG. 6 is a diagram showing a relationship between a set current and a number of pulses required to transfer droplets once.
Figure 7:
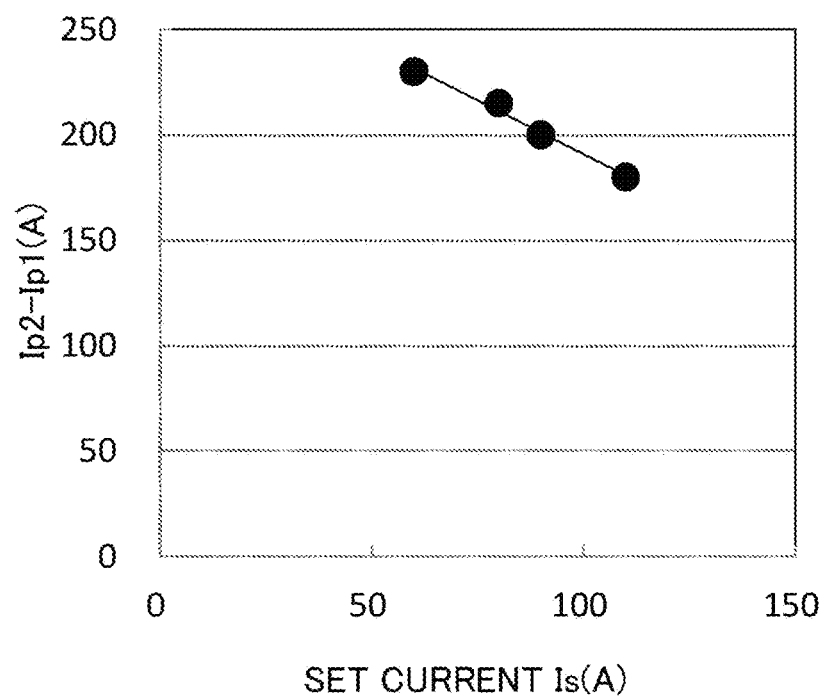
FIG. 7 is a diagram showing a relationship between the set current and a difference between a second peak current and a first peak current.
Figure 8:
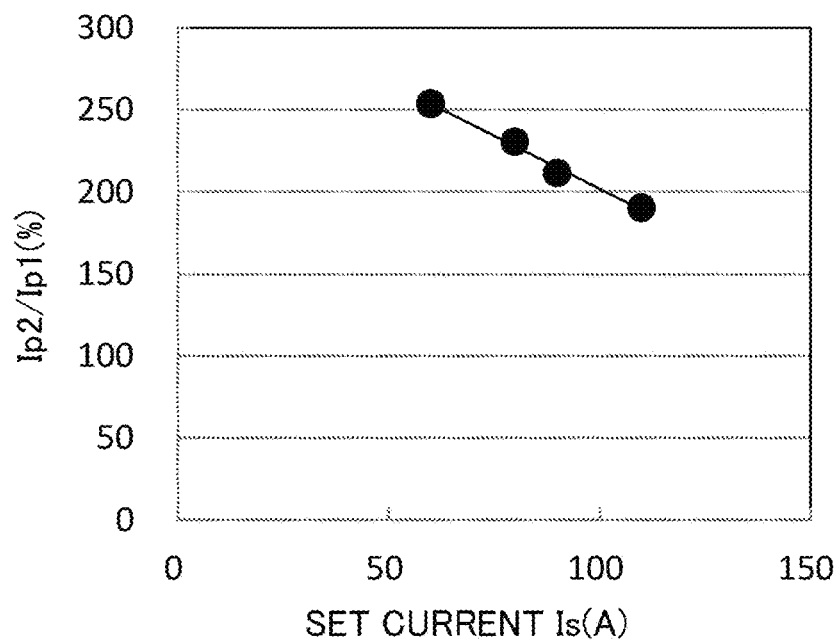
FIG. 8 is a diagram showing a relationship between the set current and a ratio of the second peak current to the first peak current.
Figure 9:
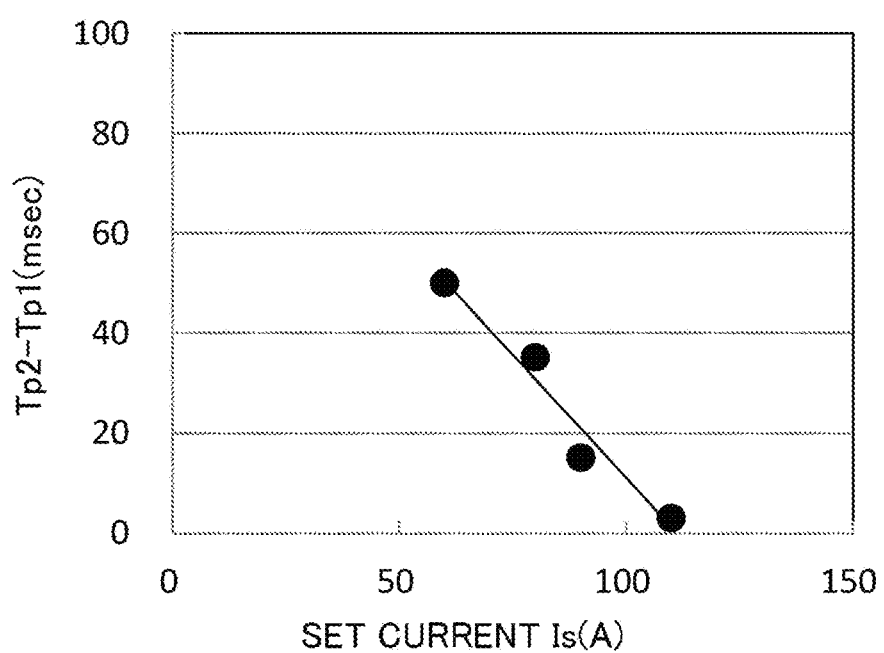
FIG. 9 is a diagram showing a relationship between the set current and a difference between a second peak period and a first peak period.

FIG. 5 shows a relationship between the set current and various outputs during pulse welding. FIG. 6 shows a relationship between the set current and the number of pulses required to transfer droplets once. FIG. 7 shows a relationship between the set current and a difference between the second peak current and the first peak current. FIG. 8 shows a relationship between the set current and a ratio of the second peak current to the first peak current. FIG. 9 shows a relationship between the set current and a ratio of the second peak period to the first peak period. Note that the second peak current Ip2 is kept constant in the present embodiment as shown in FIG. 5.

As shown in FIGS. 5 and 6, the pulse number n required to transfer droplets once is monotonously decreased in accordance with the set current Is or the wire feeding speed Wp. That is, the droplets are transferred with a smaller pulse number in accordance with an increase in the set current Is or the wire feeding speed Wp to transfer droplets in a constant cycle. In this manner, separation of droplets from the welding wire 18 can be controlled in a stable manner while keeping a small average value of the welding current I in the basic unit period Tpb. Note that the ratio of the second peak period Tp2 in the basic unit period Tpb relatively increases when the pulse number n is set to an excessively small number with respect to the set current Is or the wire feeding speed Wp. In this case, the average value of the welding current I is difficult to keep at a small value. Accordingly, control needs to be performed in consideration of this point.

Moreover, generation of spatters can be reduced by separating droplets and transferring droplets by one drop between the second peak period Tp2 and the second base period Tb2 after the current reaches the second peak current Ip2. In a more preferred embodiment, the timing of droplet separation is set between a time after the current reaches the second peak current Ip2 in the second peak period Tp2 and a time when the current reaches the base current I2 in the second base period Tb2, or a time close to the time when the current reaches the base current I2. Droplets can be transferred in a stable manner by separating the droplets during these periods.

As shown in FIGS. 5 and 7, control is performed such that a difference between the first peak current Ip1 and the second peak current Ip2 (hereinafter referred to as (Ip2−Ip1) in some cases) decreases as the set current Is or the wire feeding speed Wp increases. Moreover, as shown in FIGS. 5 and 8, control is performed such that a ratio Ip2/Ip1 i.e., a ratio of the second peak current Ip2 to the first peak current Ip1 decreases as the set current Is or the wire feeding speed Wp increases. As shown in FIG. 5, the first peak current Ip1 is increased as the set current Is or the wire feeding speed Wp increases. In this case, droplets sufficiently grow by a time immediately before the second peak current Ip2 is supplied to the welding wire 18. Accordingly, even if (Ip2−Ip1) is reduced, droplets can be securely transferred toward the base material 17.

Note that (Ip2−Ip1) needs to be maintained within an appropriate range for a change of the set current Is or the wire feeding speed Wp. For example, if (Ip2−Ip1) is excessively reduced, droplet growth and droplet separation on the welding wire 18 may end up halfway and become unstable. Specifically, when (Ip2−Ip1) is reduced by bringing the second peak current Ip2 closer to the first peak current Ip1, droplet separation is difficult to achieve during the second peak period Tp2. Accordingly, droplet separation becomes unstable. In addition, when (Ip2−Ip1) is reduced by bringing the first peak current Ip1 closer to the second peak current Ip2, droplets excessively grow on the welding wire 18. In this case, droplet separation may be caused unintentionally and a large amount of spatters may be generated during the first peak period Tp1 and the first base period Tb1 alternately repeated.

That is, if (Ip2−Ip1) is excessively reduced, spatters may be generated, or separation of droplets may become unstable.

In addition, various problems will occur if (Ip2−Ip1) is excessively large. This point therefore needs to be considered. Specifically, if (Ip2−Ip1) is raised by decreasing the first peak current Ip1, the cleaning effect is not sufficiently exerted in some cases.

Moreover, when (Ip2−Ip1) is raised by increasing the second peak current Ip2, the welding wire 18 is excessively melted. In this case, a plurality of large droplets and small droplets are produced, and a large amount of spatters are generated. Furthermore, the arc length increases by excessive burning of the welding wire 18, and an arc irradiation range is narrowed accordingly. In this case, oxygen may be easily entrained, and a large amount of smut may be produced.

In addition, when the set current Is is equal to or greater than 50 A and equal to or smaller than 110 A, the ratio Ip2/Ip1, i.e., the ratio of the second peak current Ip2 to the first peak current Ip1 is equal to or greater than 190% and equal to or smaller than 260% in a preferred embodiment.

If Ip2/Ip1 is smaller than 190%, droplet separation becomes unstable similarly to the case of an excessively small value of (Ip2−Ip1). As a result, welding becomes unstable or spatters are generated. In addition, if Ip2/Ip1 is greater than 260%, the cleaning effect may not be sufficiently exerted or a large amount of spatters or smut may be generated similarly to the case of an excessively large value of (Ip2−Ip1).

Moreover, as shown in FIGS. 5 and 9, control is performed such that the difference between the first peak period Tp1 and the second peak period Tp2 (hereinafter referred to as (Tp2−Tp1) in some cases) decreases as the set current Is or the wire feeding speed Wp increases.

By this control, separation of droplets from the welding wire 18 can be controlled in a stable manner while keeping a small average value of the welding current I in the basic unit period Tpb. When the second peak period Tp2 is set to an excessively long period, the ratio of the period in which the cleaning action is exerted, that is, the period in which the first peak period Tp1 and the first base period Tb1 are alternately performed becomes relatively small in the basic unit period Tpb. Therefore, Tp2−Tp1 needs to be set considering relative deterioration of the cleaning effect.

Effects Etc.

As described above, the arc welding control method according to the present embodiment is an arc welding control method which includes the pulse welding period Tp for feeding the welding wire 18 toward the base material 17 at the constant feeding speed Wp, and generating an arc between the base material 17 and the welding wire 18 by alternately supplying a peak current and a base current to the welding wire 18.

The pulse welding period Tp includes the first peak period Tp1 for supplying the first peak current Ip1 to the welding wire 18, and the first base period Tb1 for supplying the base current Ib smaller than the first peak current Ip1 to the welding wire 18 after the first peak period Tp1. The pulse welding period Tp further includes the second peak period Tp2 for supplying the second peak current Ip2 to the welding wire 18 after alternately repeating the first peak period Tp1 and the first base period Tb1 (n−1) times, and the second base period Tb2 for supplying the base current Ib to the welding wire 18 after the second peak period Tp2.

In addition, the second peak current Ip2 is larger than the first peak current Ip1, and droplets are transferred from the welding wire 18 toward the base material 17 during the second peak period Tp2 or the second base period Tb2.

According to the present embodiment, droplets are securely transferred to the base material 17 in the basic unit period Tpb by supplying the second peak current Ip2 larger than the first peak current Ip1 to the welding wire 18 during the second peak period Tp2.

Moreover, according to the arc welding control method of the present embodiment, droplets having a predetermined size are grown at the tip of the welding wire 18 by alternately repeating the first peak period Tp1 and the first base period Tb1. Furthermore, melting of the welding wire 18 is reduced by appropriately adjusting the first peak current Ip1. Accordingly, stable pulse welding can be performed using a low welding current as compared with so-called one-pulse one-drop control.

Generally, a heat amount input to the base material 17 in pulse welding is larger than that of short-circuit welding or the like. It is therefore difficult to reduce the size of droplets formed at the tip of the welding wire 18. In addition, droplets do not sufficiently grow when the peak current is reduced. In this case, timing for transferring the droplets to the base material 17 often varies. Generally, droplets are not transferred by one peak current in many cases when the set current Is becomes approximately 60 A. However, external appearance of welding beads may be deteriorated, or welding failure may be caused in this situation.

On the other hand, according to the present embodiment, droplets can be securely separated and transferred to the base material 17 during the basic unit period Tpb to perform arc welding which achieves reduction of the width of the welding beads even when the droplets are small. In addition, reduction of the welding current I itself is allowed. Accordingly, generation of spatters can be reduced during droplet separation.

In a preferred embodiment, the base current Ib is a current that maintains the arc length of the arc 19 generated between the welding wire 18 and the base material 17 at a predetermined value. Moreover, in a preferred embodiment, the second base period Tb2 is set to a period longer than the first base period Tb1, and the base current Ib is supplied to the welding wire 18 such that the welding wire 18 is not melted during the second base period Tb2, and that the arc length becomes the predetermined value.

Fluctuations of arc force can be stabilized during the period for alternately repeating supply of the first peak current Ip1 and the base current Ib (n−1) times by setting the base current Ib such that the arc length is maintained at the predetermined value. In this manner, performance of reducing adhesion of smut to the surface of the base material 17 is stabilized, and high-quality cleaning is achievable. Furthermore, the first peak current Ip1 can be supplied to the welding wire 18 in a stable manner during the initial first peak period Tp1 in the next basic unit period Tpb by stabilizing the arc length while substantially preventing the welding wire 18 from melting in the second base period Tb2. In this manner, pulse welding can be continuously performed in a stable manner.

In addition, adhesion of smut as oxide of metal forming the welding wire 18 or the base material 17 to the surface of the base material 17 may be reduced by irradiating the base material 17 with the arc 19 during the first peak period Tp1 and the first base period Tb1.

The surface of the base material 17 is irradiated with the arc in a state where the arc force is cyclically increased by repeating the first peak period Tp1 and the first base period Tb1. Accordingly, adhesion of smut to the surface of the base material 17 can be reduced, and the width of the cleaning region AC to which no smut adheres can be enlarged. In this manner, welding beads having beautiful external appearance can be formed. When the base material 17 is made of aluminum or an alloy containing aluminum as a main component, the control method of the present embodiment is useful in the points that adhesion of smut can be reduced, and that welding beads having beautiful external appearance can be formed. When the welding wire 18 is made of hard aluminum-based material, smut is likely to adhere to the base material 17. Accordingly, the control method of the present embodiment is particularly useful.

Second Embodiment

Figure 10:
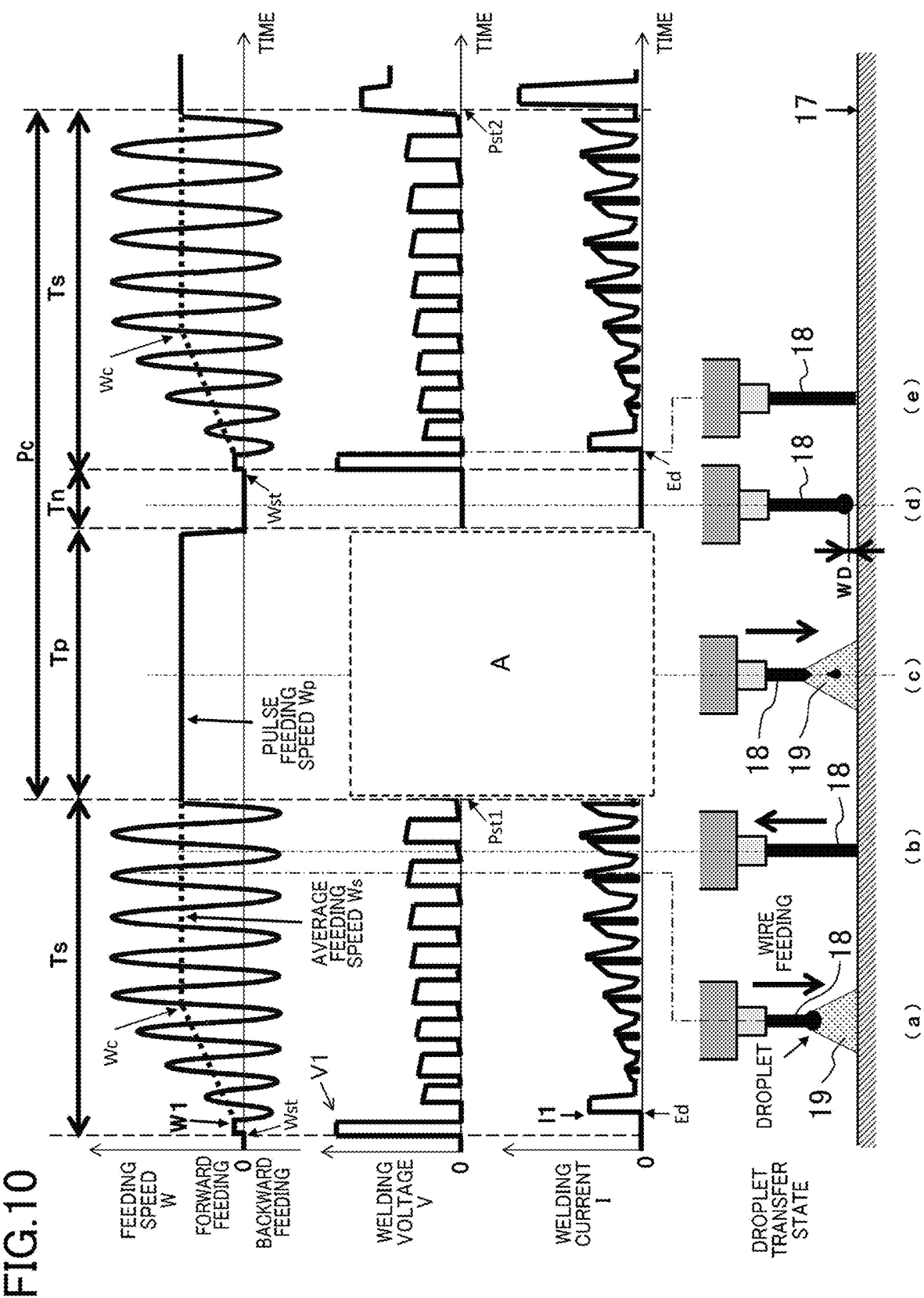
FIG. 10 is a diagram showing various output waveforms during arc welding according to a second embodiment of the present invention.

FIG. 10 shows various output waveforms during arc welding according to the present embodiment. An operation of the arc welding apparatus 16 shown in FIG. 1 will be described with reference to FIG. 10. According to the present embodiment, the arc welding apparatus 16 is operated in such a manner as to sequentially perform short-circuit welding and pulse welding during arc welding, and then perform a cooling period for setting the welding current to zero. Note that the torch (not shown) holding the welding wire 18 is controlled so as to move at a constant speed in a predetermined section where welding is performed. Specifically, instead of performing welding during a stop of the torch, and moving the torch to a next teaching point after stopping welding as in ordinary stitch welding, the torch continuously moves such that the welding speed is kept constant in the predetermined section. Note that the welding speed is not required to be constant throughout an entire welded portion of the base material 17. For example, the welding speed may be changed in such a portion where the plate thickness of the base material 17 changes.

Moreover, in a portion A surrounded by a broken line in FIG. 10, pulse welding is performed by repeating the basic unit period Tpb shown in FIGS. 2 and 3 once or a plurality of times.

Initially, feeding of the welding wire 18 starts at a feeding speed W1 from a time Wst when an instruction of a welding start is given. Thereafter, short-circuit welding is performed in accordance with control of a welding output by the short-circuit welding controller 11 under conditions set by the short-circuit welding setting part 23 from the time Wst when the instruction of the start of welding is given, or from a time Ed when a short circuit between the welding wire 18 and the base material 17 as a welding target is detected after the instruction of the welding start. Subsequently, the control switch 9 switches welding from short-circuit welding to pulse welding after an elapse of a predetermined time Ts (hereinafter referred to as first short-circuit welding period Ts) preset by the short-circuit welding setting part 23. Thereafter, the welding output is controlled by the pulse welding controller 12 under conditions set by the pulse welding setting part 24 to perform pulse welding from a pulse welding start point Pst (Pst1, Pst2) while repeating a peak current and a base current. At this time, the welding current I is controlled by the pulse welding controller 12 so as to produce the waveform shown in FIG. 2.

After an elapse of the predetermined time Tp preset by the pulse welding setting part 24, the control switch 9 switches welding from the pulse welding to the cooling period. An output from the output controller 10 is cut off during a predetermined time Tn set by the cooling period setting part 25. In this manner, the heat amount input by the arc can be reduced to zero. Scaly welding beads are formed by sequentially repeating the first short-circuit welding period Ts, the pulse welding period Tp, and the cooling period Tn described above as one welding cycle.

As shown in FIG. 10, the pulse welding period Tp for inputting a large heat amount is provided after the first short-circuit welding period Ts, and subsequently the cooling period Tn for inputting no heat amount is provided. In this manner, a cooling effect at the welding portion improves, and the difference in the heat input amount can be maximized. Accordingly, scaly welding beads with clear corrugations can be produced. In the cooling period Tn, highest cooling performance is achievable with no heat input when the outputs of the welding current and the welding voltage are set to zero. When only the welding current is set to zero with the welding voltage still applied, the state of generation of no-load voltage can be maintained. In this case, a next arc can be smoothly started. Assuming that a cycle from the pulse welding start point Pst1 in the pulse welding period Tp to the pulse welding start point Pst2 in the pulse welding period Tp of the next cycle is a cycle Pc of the pulse welding period, corrugations have a rough shape in the longer cycle Pc of the pulse welding period, and a tight shape in the shorter cycle Pc.

Moreover, if a molten pool is not formed immediately below the arc 19 when the arc 19 is generated in the pulse welding period Tp, droplets of the welding wire 18 are blown off at the time of output of the second peak current Ip2. As a result, spatters are generated. Therefore, the short-circuit welding period Ts is provided before the pulse welding period Tp. In this manner, a molten pool is formed immediately below the arc at the time of switching to the pulse welding period Tp. Accordingly, generation of spatters by the second peak current Ip2 can be reduced.

At an arc start in the first short-circuit welding period Ts, a no-load voltage V1 higher than the welding voltage during the pulse welding period Tp is output, and feeding is performed at the constant feeding speed W1 until current is detected with a short circuit caused between the welding wire 18 and the base material 17 as shown in FIG. 10. A welding current I1 after the current detection is larger than the welding current during short-circuit opening of this welding. The welding current I1 is output for a predetermined period. During this period, the welding wire 18 is fed backward at a predetermined amplitude. After short-circuit opening, the welding wire 18 is fed at predetermined amplitude and frequency while repeating forward feeding and backward feeding. While FIG. 10 shows a sine wave as the feeding waveform, any cyclic waveforms such as a trapezoidal wave (not shown) may be adopted as the feeding waveform. In addition, the frequency (cycle) may be either constant or variable. Moreover, management becomes easier when the feeding speed is kept constant during feeding with no amplitude and frequency determined beforehand. However, spatters are likely to be generated by electromagnetic pinch force during short-circuit opening. Therefore, generation of spatters during short-circuit opening in the first short-circuit welding period Ts can be reduced by mechanically feeding the welding wire 18 forward and backward at the predetermined amplitude and frequency.

A droplet transfer state at this time is shown in a bottom row of FIG. 10. A state (a) shows a droplet transfer state during the arc period of the short-circuit arc welding in the first short-circuit welding period Ts. In this state, the welding wire 18 is fed forward while generating an arc. A state (b) shows a droplet transfer state during the short-circuit period of the short-circuit arc welding in the first short-circuit welding period Ts. In this state, droplets at the tip of the welding wire are transferred to the base material 17, and then the wire is fed backward to mechanically promote short-circuit opening. Next, the welding wire 18 in the pulse welding period Tp is fed at an optimal constant feeding speed for the welding current set by the pulse welding setting part 24. During the second peak period Tp2 for supplying the second peak current Ip2 shown in FIG. 2 to the welding wire 18, the droplets formed at the tip of the welding wire 18 are separated, and transferred toward the base material 17 during the second peak period Tp2 or the second base period Tb2. Then, in the cooling period Tn after completion of the pulse welding period Tp, the feeding speed is controlled such that feeding of the welding wire 18 is stopped as shown in a state (d). A distance from the tip of the welding wire 18 to the base material 17 at that time is WD. After an elapse of the cooling period Tn, the next cycle is again executed. As shown in a state (e), current is detected by a contact between the welding wire 18 and the base material 17, and then the next first short-circuit welding period Ts is restarted. In this manner, the arc maintained in the first short-circuit welding period Ts and the pulse welding period Tp disappears in the cooling period Tn. A further arc needs to be regenerated at the time of switching to the next first short-circuit welding period Ts. Accordingly, spatters are easily generated by electromagnetic pinch force during short-circuit opening at an initial stage of the arc start. However, as shown in the present embodiment, the welding wire 18 is mechanically fed forward and backward in the first short-circuit welding period Ts. Accordingly, generation of spatters can be reduced during short-circuit opening at the initial stage of the arc start. That is, generation of spatters by the electromagnetic pinch force can be reduced by feeding the welding wire 18 forward and backward in the first short-circuit welding period Ts to mechanically open the short-circuit state.

As shown in FIG. 10, the welding current I and the feeding speed W in the first short-circuit welding period Ts are changed every moment. Particularly, an average feeding speed of the feeding speed is gradually increased so as to approach a setting feeding amount of the welding conditions in the pulse welding period Tp.

Low heat input short-circuit welding, high heat input pulse welding, and the cooling period for inputting no heat amount are each adjusted by performing welding in a cycle which sequentially repeats the first short-circuit welding period Ts, the pulse welding period Tp, and the cooling period Tn described above. In this manner, the heat amount input to the base material 17 can be widely controlled, and the welding bead shape can be more precisely controlled. Moreover, pulse welding is allowed to be performed using a low current. In this case, a bead width close to short-circuit welding can be achieved. Accordingly, arc welding having a constant narrow bead width can be performed. Furthermore, in the pulse welding period Tp, the surface of the base material 17 is cleaned in the process of repeating the first peak period Tp1 and the first base period Tb1, and droplets are transferred from the welding wire 18 toward the base material 17 during the second peak period Tp2 or the second base period Tb2 similarly to the first embodiment. In this manner, arc welding with reduced spatters and reduced smut adhesion can be performed, and welding beads having preferable external appearance can be formed.

While the welding wire 18 is fed at the amplitude and the frequency determined beforehand during the first short-circuit welding period Ts, the welding wire 18 in this period may be fed in different manners. As described above, the welding wire 18 may be fed at a constant feeding speed during the first short-circuit welding period Ts to facilitate management.

In addition, the welding wire 18 is fed at the constant feeding speed during the pulse welding period Tp. However, the welding wire 18 in this period may be fed in different manners. The feeding speed of the welding wire 18 may be changed during the pulse welding period Tp.

Moreover, the average feeding speed Ws is increased to the constant feeding speed during the pulse welding period Tp during the first short-circuit welding period Ts. However, the average feeding speed Ws is not limited to this speed. The average feeding speed Ws at the time of completion of the first short-circuit welding period Ts may be different from the constant feeding speed during the pulse welding period Tp.

Other Embodiments

While not shown in the figures, a second short-circuit welding period Tse may be provided between the pulse welding period Tp and the cooling period Tn shown in FIG. 10. During the second short-circuit welding period Tse, the average feeding speed Ws is gradually decreased. An arc length of short-circuit welding is shorter than that of pulse welding. Accordingly, the distance WD between the welding wire tip and the base material at the time of completion of welding can be shortened, and fluctuations in the cooling period Tn can be reduced. In this case, uniform welding beads can be formed by maintaining the cycle Pc of the pulse welding period at a constant cycle.

Moreover, the shielding gas may contain $CO_2$ gas or $O_2$ gas. For example, a mixed gas constituted by 80% Ar gas and 20% $CO_2$ gas, or a mixed gas constituted by 98% Ar gas and 2% $O_2$ gas may be used. However, $CO_2$ gas decomposes and generates oxygen ($O_2$) during arc welding. This oxygen reacts with metal constituting the welding wire 18 or the base material 17, and forms smut. Therefore, in a preferred embodiment, the ratio of $CO_2$ gas or $O_2$ gas is lowered within a range meeting arc welding specifications. From this viewpoint, in a more preferred embodiment, the shielding gas is 100% Ar gas.

Alternatively, 100% He (helium) gas may be used as the shielding gas. In this case, the shielding gas does not contain oxygen or $CO_2$ similarly to above. Accordingly, smut is less likely to adhere to the base material 17.

According to the first and second embodiments, the base material 17 is made of aluminum or an alloy containing aluminum as a main component, while the welding wire 18 is made of hard aluminum. However, other materials may be used instead of these materials.

The arc welding control method according to the present invention is capable of securely transferring droplets to a base material during a predetermined period, and is particularly useful when applied to pulse welding.

DESCRIPTION OF REFERENCE CHARACTERS

1 Input Power Source
2 Main Transformer (Transformer)
3 Primary Side Rectifier
4 Switch
5 DCL (Reactor)
6 Secondary Side Rectifier
7 Welding Current Detector
8 Welding Voltage Detector
9 Control Switch
10 Output Controller
11 Short-circuit Welding Controller
12 Pulse Welding Controller
13 Wire Feeding Speed Controller
14 Wire Feeding Speed Detector
15 Calculator
16 Arc Welding Apparatus
17 Base Material
18 Welding Wire
19 Arc
20 Welding Tip
21 Wire Feeder
22 Welding Condition Setting Part
23 Short-circuit Welding Setting Part
24 Pulse Welding Setting Part
25 Cooling Period Setting Part

The invention claimed is:

1. An arc welding control method comprising:
   feeding a welding wire toward a base material at a constant feeding speed; and
   generating an arc between the base material and the welding wire by alternately supplying a peak current and a base current to the welding wire, wherein the feeding of the welding wire and the generating of the arc are performed in a pulse welding period, the pulse welding period including:
a first peak period in which a first peak current is supplied to the welding wire;
a first base period in which the base current is supplied to the welding wire, the base current being smaller than the first peak current, the first base period being after the first peak period;
a single second peak period in which a second peak current is supplied to the welding wire after alternately repeating the first peak period and the first base period (n−1) times (n is an integer equal to or larger than 2); and
a single second base period in which the base current is supplied to the welding wire after the second peak period,
the second peak current being larger than the first peak current, and
wherein droplets are transferred once from the welding wire toward the base material during the single second peak period or the single second base period.

2. The arc welding control method of claim 1, wherein
The droplets are separated within a period from a time when a welding current reaches the second peak current in the single second peak period to the single second base period.

3. The arc welding control method of claim 1, wherein
the number of times of alternately repeating the first peak period and the first base period is reduced as a set current which is a set average value of a welding current or a feeding speed of the welding wire increases.

4. The arc welding control method of claim 1, wherein
droplets having a predetermined size are grown at a tip of the welding wire by alternately repeating the first peak period and the first base period.

5. The arc welding control method of claim 1, wherein
the base current is a current that maintains an arc length of an arc generated between the welding wire and the base material at a predetermined value.

6. The arc welding control method of claim 5, wherein
the single second base period is longer than the first base period, and the base current is supplied to the welding wire such that the welding wire is not melted during the single second base period, and that the arc length becomes the predetermined value.

7. The arc welding control method of claim 1, wherein
a difference between the first peak current and the second peak current, and a ratio of the second peak current to the first peak current are decreased, as a set current which is a set average value of a welding current or a feeding speed of the welding wire increases.

8. The arc welding control method of claim 1, wherein
a ratio of the second peak current to the first peak current is equal to or greater than 190% and equal to or smaller than 260% when a set current which is a set average value of a welding current is equal to or greater than 50 A and equal to or smaller than 110 A.

9. The arc welding control method of claim 1, wherein
a difference between the first peak period and the single second peak period is decreased, as a set current which is a set average value of a welding current or a feeding speed of the welding wire increases.

10. The arc welding control method of claim 1, wherein
adhesion of oxide of metal forming the welding wire or the base material to a surface of the base material is reduced by irradiating the base material with an arc during the first peak period and the first base period.

11. The arc welding control method of claim 1, wherein
a first short-circuit welding period is provided after the pulse welding period, the first short-circuit welding period being a period for alternately repeating a state where an arc is generated between the base material and the welding wire, and a state where the base material and the welding wire are short-circuited, by alternately repeating forward feeding and backward feeding of the welding wire with respect to the base material.

12. The arc welding control method of claim 11, wherein
a cooling period is provided between the pulse welding period and the first short-circuit welding period, the cooling period being a period for setting a heat amount input to the base material to zero.

13. The arc welding control method of claim 12, wherein
a second short-circuit welding period is further provided between the pulse welding period and the cooling period, the second short-circuit welding period being a period for alternately repeating a state where an arc is generated between the base material and the welding wire, and a state where the base material and the welding wire are short-circuited, by alternately repeating forward feeding and backward feeding of the welding wire with respect to the base material.

14. The arc welding control method of claim 1, wherein
the base material is aluminum or an alloy that contains aluminum as a main component.

15. The arc welding control method of claim 1, wherein
a shielding gas sprayed onto the base material is a gas containing argon gas at a ratio of 80% or more.

16. The arc welding control method of claim 1, wherein
the shielding gas sprayed on the base material is helium gas.

* * * * *